United States Patent [19]
Fink

[11] Patent Number: 5,262,889
[45] Date of Patent: Nov. 16, 1993

[54] OPTICAL FREQUENCY SHIFTER

[75] Inventor: David Fink, Los Angeles, Calif.

[73] Assignee: Hughes Aircraft Company, Los Angeles, Calif.

[21] Appl. No.: 871,890

[22] Filed: Apr. 21, 1992

[51] Int. Cl.$^5$ .............................................. A03F 7/00
[52] U.S. Cl. .................................. 359/326; 359/868; 372/99
[58] Field of Search ............... 359/326, 327, 328, 329, 359/330, 331, 332, 838, 868; 372/98, 99, 108, 28, 32

[56] References Cited

U.S. PATENT DOCUMENTS

| | | | |
|---|---|---|---|
| 4,088,898 | 5/1978 | Stitch | 359/326 |
| 4,264,141 | 4/1981 | Guers et al. | 359/326 |
| 4,418,989 | 12/1983 | McCulla et al. | 359/326 |
| 5,007,721 | 4/1991 | Morris et al. | 359/326 |

FOREIGN PATENT DOCUMENTS

3-206431  9/1991  Japan .................................... 359/326

*Primary Examiner*—Frank Gonzalez
*Attorney, Agent, or Firm*—William J. Streeter; Wanda K. Denson-Low

[57] ABSTRACT

A method and apparatus for frequency shifting an optical beam where the frequency shifted beam remains both spatially and temporally coherent with no spread in frequency and can be continually tuned in frequency shift over a wide range without any change in beam pointing or beam quality with time. This is achieved by changing the effective optical path length of the resonant cavity of a laser by translating an optical wedge, such as a prism, across the optical path in the direction of the wedge gradient. In a first embodiment, a rotating helical phase plate is used to linearly increase the optical path of a transmitted or reflected beam with time, thereby frequency shifting the exiting beam. In another embodiment, the rim of a wheel with a spirally increasing or decreasing radius is used in which the outer periphery of the wheel is a mirror. Spinning the wheel at a constant rotational speed increases or decreases the optical path of a reflected beam linearly with time, thereby frequency shifting the reflected beam. The helical phase plate can be used in either a transmissive mode or a reflective mode, whereas the spiral wheel is used primarily in a reflective mode.

28 Claims, 3 Drawing Sheets

OPTICAL FREQUENCY SHIFTER

BACKGROUND OF THE INVENTION

1. Field of the Invention

The invention relates generally to optical frequency shifters, and more particularly to a method and apparatus for frequency shifting an optical beam by the use of a phase plate or a spiral wheel.

2. Description of the Prior Art

The prior art uses a variety of methods and apparatus for optical frequency shifting. For example, the prior art utilizes the surface of a rotating wheel to scatter light in order to effect a frequency shift. The scattering of this method and apparatus does provide a Doppler shift, but it also yields a scattered, as distinct from a reflected, beam of light. This beam cannot be used as a local oscillator because of the loss of spatial coherence. Also, the scattered beam has a spread of Doppler shifts because different parts of the illuminated spot on the wheel have different line-of-sight velocities, and if a range of scattered angles are collected, they all have different Doppler shifts even if they all come from essentially the same location on the surface of the wheel because of the different angles between the scattered direction and the velocity of the scattering center.

Other methods include the use of a vibrating mirror or electro-optical phase modulator, which can be used to provide a frequency shifted beam for only a short period of time because such systems must be reset and repeated after adding only about one to 10 wavelengths of optical path compared to about one thousand wavelengths that can be added in the present invention before it must be reset.

Prior art systems employing electro-optic amplitude modulation impress frequency sidebands on the beam. These sidebands can be shifted up to about 100 MHz, but the modulator does not spatially separate them from each other or from the unshifted beam.

Acousto-optic modulation utilizes radio frequencies to set up a traveling acoustic wave in a germanium crystal. The light is then reflected off of the changes in index of refraction that are caused by the density waves. This can be up to 80% efficient, but the direction of the reflected beam depends on the frequency shift imposed. Frequency shifts of 40 MHz to 110 MHz can be obtained by this method.

Furthermore, Raman scattering can provide large, fixed frequency shifts on the order of 50 GHz. Other techniques, such as parametric amplification and other non-linear processes, have been tried but are usually of such low efficiency and are so difficult to implement that they are not generally used.

The present invention solves substantially all of the problems of the prior art while avoiding most of its short comings.

BRIEF SUMMARY OF THE INVENTION

The invention provides a very simple and inexpensive method of frequency shifting an optical beam. The frequency shifted beam remains both spatially and temporally coherent with no spread in frequency, and it can be continuously tuned in frequency shift over a wide range without any change in beam pointing or beam quality.

The invention utilizes an optical wedge located in the optical path of an optical beam from a laser. The optical wedge, which may be reflective or transmissive, is translated across the optical path in the direction of the wedge gradient, thereby shortening or lengthening the effective optical path length of the resonant cavity. In one embodiment of the invention, the optical beam is transmitted through a simple, transparent prism. The prism is translated at a constant velocity (without rotation) in the direction of its thickness gradient. As thicker (or thinner) portions of the prism are moved into the path of the beam, the effective optical path length of the optical beam increases (or decreases) uniformly, which adds (or subtracts) a uniformly changing phase to the beam. A uniformly changing phase shift applied to the beam is a frequency shift. While this embodiment of the invention is simple, it suffers from two disadvantages: it supplies a shift for only a short time, after which the prism must be brought back to its original position to repeat the process; and it is difficult to maintain a uniform linear velocity.

In a first embodiment, a rotating helical phase plate to linearly increase or decrease the optical path of the beam with time, thereby frequency shifting the exiting beam. In a second embodiment, the invention uses the rim of a wheel with a spirally increasing or decreasing radius as a mirror. Spinning the wheel linearly increases or decreases the optical path of the beam with time, thereby frequency shifting the reflected beam. The optical correction required to compensate for distortion introduced by the spiral is mainly cylindrical and can be easily done using a conventional cylindrical lens. Frequency shifted optical beams have particular application in hetrodyne detection of laser radar signals where there is no or at least a very small relative velocity between the transmitter and the target. The local oscillator must be frequency shifted from the transmitter to provide a difference frequency for the hetrodyne mixing. Without some kind of frequency shifter, separate lasers must be used for the transmitter and the receiver.

In a first embodiment of the present invention, a phase plate wheel whose thickness increases linearly with angular location about the wheel is used. The optical beam is transmitted through this variable thickness portion or reflected off of it, and the phase plate wheel is spun or rotated to vary the length of the optical path. For dynamic balancing purposes, the wheel should have at least two cycles of increasing thickness. Any energy absorbed by the wheel is distributed over the face of the wheel and is not concentrated on just the area of the beam spot. The phase plate introduces a distortion into the beam because the optical wedge is in a tangential direction, which is different for different parts of the beam spot on the plate. However, this is a static distortion (that is, it does not change as the wheel rotates) and can be corrected with a conventional corrector plate. Its magnitude depends on the beam spot size, its distance to the enter of the wheel, and the phase wedge of the wheel.

In the second embodiment of the present invention, a wheel having a spirally increasing radius is provided. The rim of the wheel is used as a mirror, and the wheel is spun to linearly increase or decrease the length of the optical path. For dynamic balancing purposes, the wheel should have at least two cycles of spirals on the rim. As with the phase plate wheel, the spiral wheel also has any energy absorbed thereby distributed over the whole circumference of the wheel and not concentrated on just the area of the beam spot. In the phase plate embodiment of the present invention, the frequency shift can be done in either a transmission mode or a reflective mode. In the spiral wheel embodiment, use of the transmissive mode is possible, although much more difficult to implement than in the reflective mode.

These and other objects and advantages of the present invention will be more fully understood after reading the detailed description of the preferred embodiments, the claims, and the drawings, which are briefly described hereinbelow.

DETAILED DESCRIPTION OF THE PREFERRED EMBODIMENT

In the first embodiment of the present invention, a wheel phase plate whose thickness increases linearly with angular location about the wheel is provided. The optical beam is transmitted through this variable thickness portion (transmissive mode) or reflected off of it (reflective mode), and the phase plate wheel is spun or rotated to vary the length of the optical path, thereby producing the desired frequency shift. Recall that a time dependent phase shift is, in actuality, a frequency shift. For dynamic balancing purposes, the wheel should have at least two cycles or repetitions of increasing (or decreasing) thickness.

Figure 1:
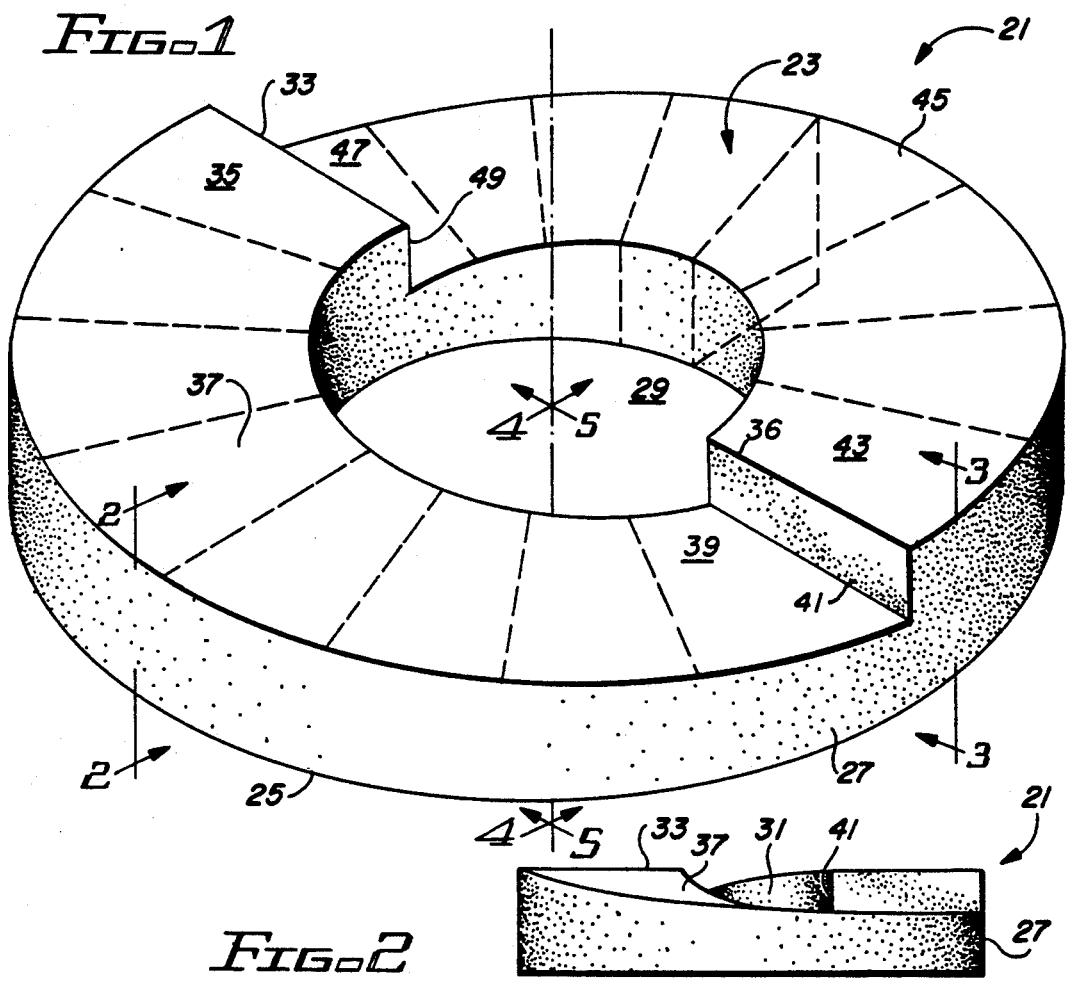
FIG. 1 is a perspective view of the helical phase plate optical frequency shifter of a first embodiment of the present invention.

Such a wheel is shown in FIG. 1. Note that any energy absorbed by the wheel is distributed over the face of the wheel as the wheel spins, and is not concentrated on just the area of the beam spot. The phase plate wheel 21 of FIG. 1 introduces a distortion into the optical beam because the wedge is in a tangential direction, which is different for different parts of the beam spot on the plate. However, this is only a static distortion (it does not change as the plate is rotated) and can be corrected with a conventional fixed corrector plate. The magnitude of the distortion depends on the beam spot size, its distance to the center of the wheel, and the phase wedge of the wheel.

In FIG. 1, the phase plate wheel 21 is shown as having a top or upper surface 23, a bottom or lower surface 25, and an outer peripheral edge 27. The bottom surface 25 is normally planar while the upper surface 23 contains the spiral ramps, as hereinafter described. The wheel 21 of FIG. 1 is shown as being annular and includes an annular central or axial opening 29 surrounded by an annular wall portion 31.

The upper surface 23 of the spiral phase plate 21 is shown as having an upper edge 33 where the highest thickness or height portion 35 of the downwardly-sloping optical wedge surface 37 begins. The lowest surface thickness or height portion 39 of the downwardly-sloping spiraled ramp 37 is disposed proximate the bottom edge of a generally vertical abutment 41 whose top edge 36 starts the highest portion 43 of a second downwardly-sloping wedge or ramp surface 45, which terminates in a lowest surface portion 47 adjacent the bottom edge of the abutment surface 49. In this manner, two downwardly-spiraled optical wedges or ramps (or, alternatively, upwardly-spiraled optical wedges or ramps) are provided for varying the wedge thickness as the wheel is rotated about its axis to linearly change or vary the optical path with time to provide the desired frequency shift.

Figure 2:
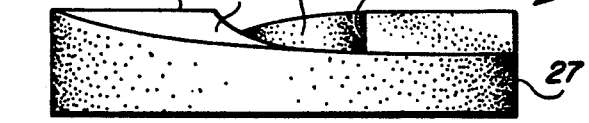
FIG. 2 is a side view of the phase wheel of FIG. 1 taken along view lines 2—2 thereof.
Figure 3:
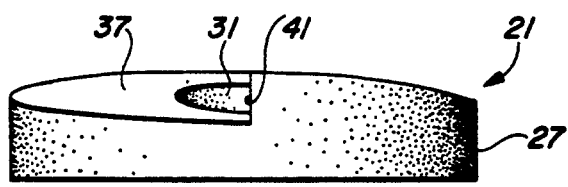
FIG. 3 is a side view of the phase wheel of FIG. 1 taken along view lines 3—3 thereof.
Figure 4:
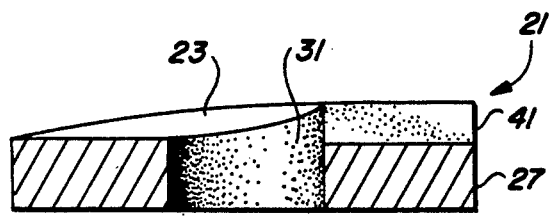
FIG. 4 is a sectional side view of the phase wheel of FIG. 1 taken along view lines 4—4 thereof.
Figure 5:
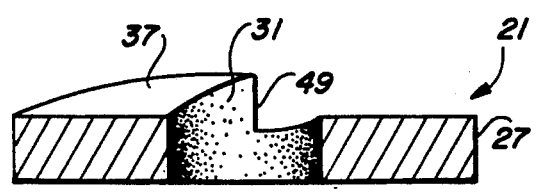
FIG. 5 is a sectional side view of the phase wheel of FIG. 1 taken along view lines 5—5 thereof.

FIGS. 2 and 3 show two different side views of the phase plate 21 of FIG. 1 while FIGS. 4 and 5 illustrate two different sectional side views of the phase plate 21 of FIG. 1.

Figure 6:
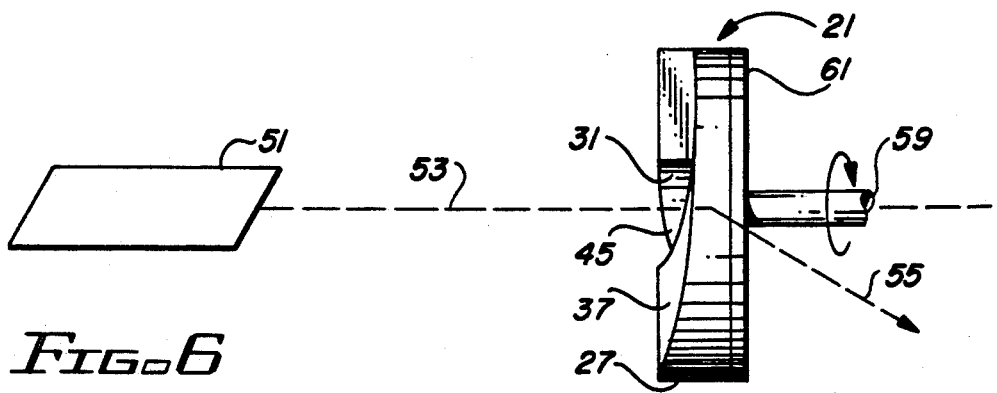
FIG. 6 is a schematic illustration of the implementation of the phase plate of FIG. 1 in a transmissive mode application.

FIG. 6 shows a laser 51 (for example, a $CO_2$ laser operating at 10.6 $\mu$m wavelength) and a phase wheel 21 at least the ramps of which are made of germanium and which has an index of refraction of 4.0. If the wheel 21 is 5 cm in diameter and the ramp thickness increases by 2 mm over half a rotation, the phase plate will add 566 wavelengths in half a revolution of the wheel 21. If the wheel 21 is rotated at 100 Hz (6000 rpm), the frequency shift will be 113 kHz. The static distortion introduced by the phase wheel 21 can be corrected by a conventional fixed corrector and amounts to about one half of a wavelength over a 2 mm diameter beam spot size. This same performance can be obtained for a reflective phase wheel if the phase thickness grows by a 3 mm over half a rotation of the wheel. If the reflective wheel is used for a helium-neon beam at 0.6328 $\mu$m wavelength, the frequency shift will be 1.9 MHz.

Figure 7:
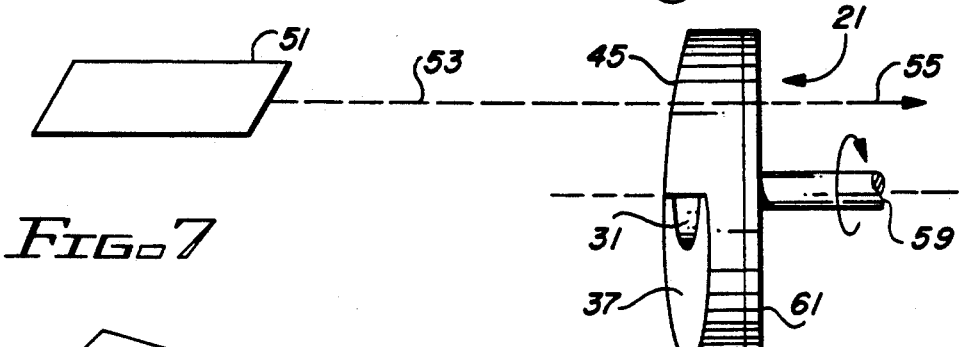
FIG. 7 is another view of the phase wheel of FIG. 6.

FIG. 7 shows a source of an optical beam such as a laser 51 emitting an optical beam 53 that is transmitted through the wheel 21, including the plate 61, as it rotates about axle or shaft 59 as transmitted beam 55. The transmitted beam 55 is deviated toward the thicker direction of the wedge of the plate, but because the wedge is in a tangential direction and not in a radial direction, from the view of FIG. 7, the deviation is out of the paper and so it looks undeviated from the front. From the top view, as shown in FIG. 6, the deviation can be plainly seen in the transmitted beam 55.

Figure 8:
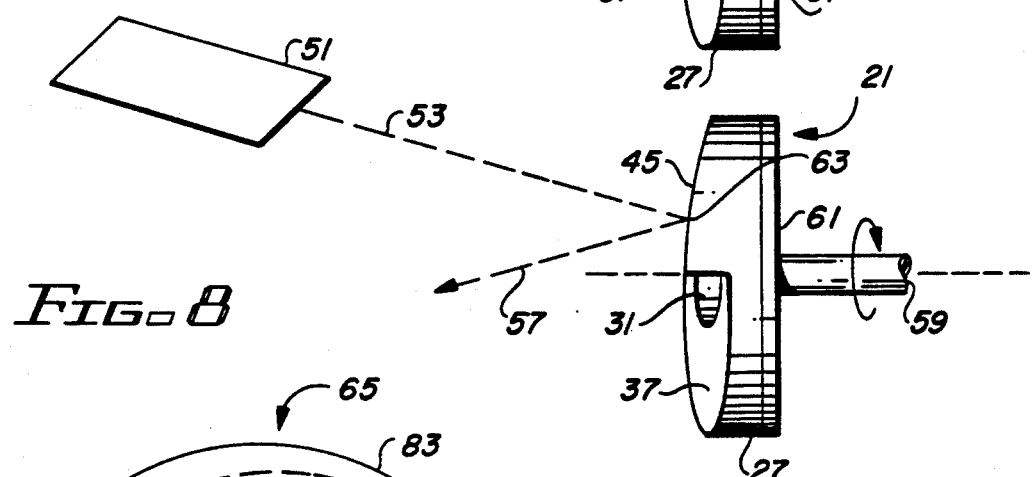
FIG. 8 is a schematic illustration of a phase wheel used the reflective mode.

FIG. 8 shows a laser 51 emitting a beam 53 that is reflected at a point of impingement 63 off of the mirrored surface of the ramp 45 of the phase wheel 21 as a reflected beam 57. Again, as the wheel 21 is rotated about the shaft 59, the length of the optical path changes continuously in a linear manner with time and hence the frequency shifts, as desired.

The frequency shift stability of the phase wheel 21 of FIG. 1 will depend on the uniformity of the average wheel wedge over the illuminated spot size. This can be reduced to lower than 0.01% around the whole wheel. Stability will also depend on the uniformity of the speed of rotation of the wheel during a revolution and over many revolutions, which can also be held below 0.01%. Thermal expansion of the wheel thickness with temperature and the temperature dependence of the index of refraction, for a transmissive wheel, will limit the long term repeatability, but the thermal expansion of germanium is very low ($5.7 \times 10^{-6}/°$ C.), as is the thermal change of the index of refraction ($2.8 \times 10^{-4}/°$ C.), so that neither has any significant effect.

Figure 9:
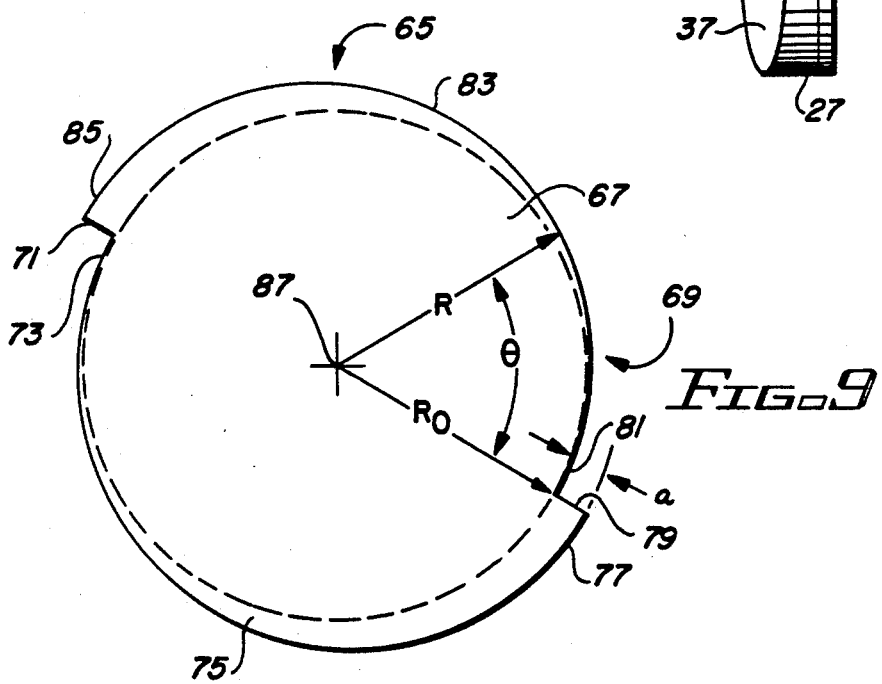
FIG. 9 is a schematic illustration of a spiral wheel optical phase shifter of a second embodiment of the present invention.

FIG. 9 shows a second embodiment of the optical frequency shifter of the present invention, which employs a spiraled wheel 65 having a body 67 and an outer peripheral rim surface 69. A generally radial abutment, 71 begins spiral path 75 of increasing thickness of radius at a low portion 73, and the spiraling path terminates at a high end portion 77 at a second radial abutment surface 79. A second path of increasing radius represented by the spirally increasing surface 83 begins at a low height or radius 81 adjacent the bottom edge of the abutment surface 79 and terminates in a high surface portion 85 adjacent the top edge of the opposite abutment surface 71. The spiral phase wheel 65 of FIG. 9 has an axis or center of rotation 87 and shows an angle "$\theta$", where the initial or circular radius is given by "$R_o$" and the ever-increasing radius is given by the formula $$R = R_o + \frac{a}{\pi} \theta,$$

where "a" is the height of the abutment surface 79 or 71 between the low edge and high edge of surfaces 81, 77 and 73, 85, respectively.

Figure 10:
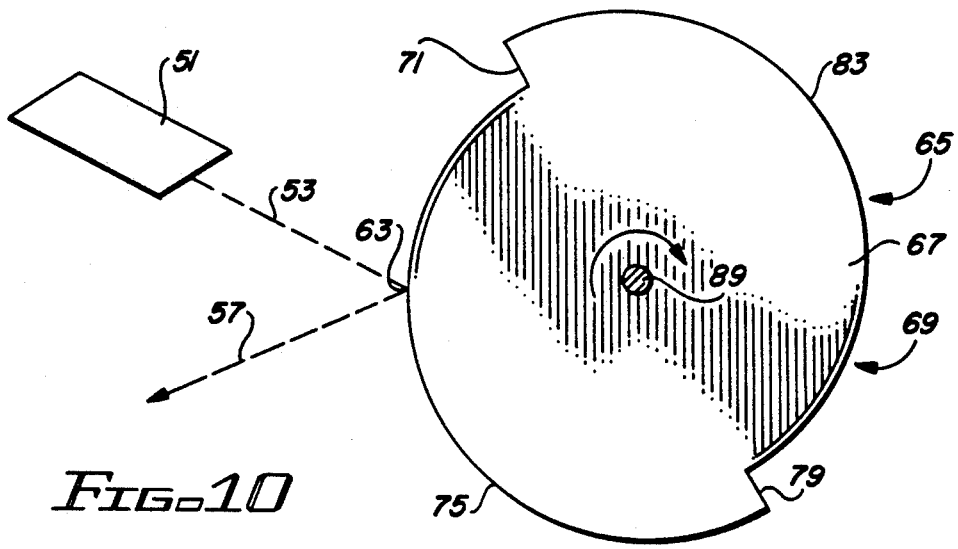
FIG. 10 is a schematic illustration of the spiral wheel optical phase shifter of FIG. 9 used in the reflective mode.

FIG. 10 shows a laser 51 emitting a coherent beam of light 53 that impinges on a spot 63 on the radially spiraling mirrored surface 75 to produce a reflected beam 57. The radial phase wheel 65 is shown as being rotated in the clockwise direction about the shaft 89. The spiral phase wheel 65 of FIG. 10 uses the outer peripheral rim 69 of the wheel with a spirally increasing or decreasing radius as an optical mirror. Uniformly spinning the wheel about its axis through shaft 89 linearly increases or decreases the optical path length of the optical beam with time, thereby frequency shifting the reflected beam. The optical correction required to compensate for the spiral is mainly cylindrical and can be easily done using a conventional cylindrical lens. For dynamic balancing purposes, the wheel should have at least two cycles of spirals on its peripheral rim. Any energy absorbed by the wheel is distributed over the whole circumference of the wheel as the wheel spins and is not concentrated on just the area of the beam spot. While the preferred embodiment of the spiral phase wheel of the present invention is for use in a reflective mode, it is also possible, with some possible difficulty in implementation, to use it in a transmissive mode, where the spiral rim wedge or layer is transparent.

The spiral wheel rim 69 acts as a cylindrical mirror, and some higher order distortions exist because the spiral does not have a constant radius of curvature. The average cylindrical component of the distortion can be removed with a conventional cylindrical lens. Spinning the spiral wheel about its axis introduces dynamic (time-dependent) tilt, cylinder, and higher order distortions into the beam as different portions of the optical wedge of the spiral rim are brought into use. The average cylinder and distortion is a static effect and can be removed with a conventional fixed corrector plate, which can be part of the cylindrical lens system. The higher than cylinder distortions will generally be negligible, so usually there will be no need for a corrector plate, just the corrective cylindrical lens. The dynamic residuals and the dynamic tilt can be reduced to a negligible amount by increasing the radius of the wheel and decreasing the spiral amplitude. Decreasing the spiral amplitude reduces the frequency shift, but this can be recovered while still discriminating against the dynamic tilt by using multiple reflections off of the spiral wheel, because the dynamic tilt varies as the square of the spiral amplitude while the frequency shift is proportional to the spiral amplitude itself.

Figure 11:
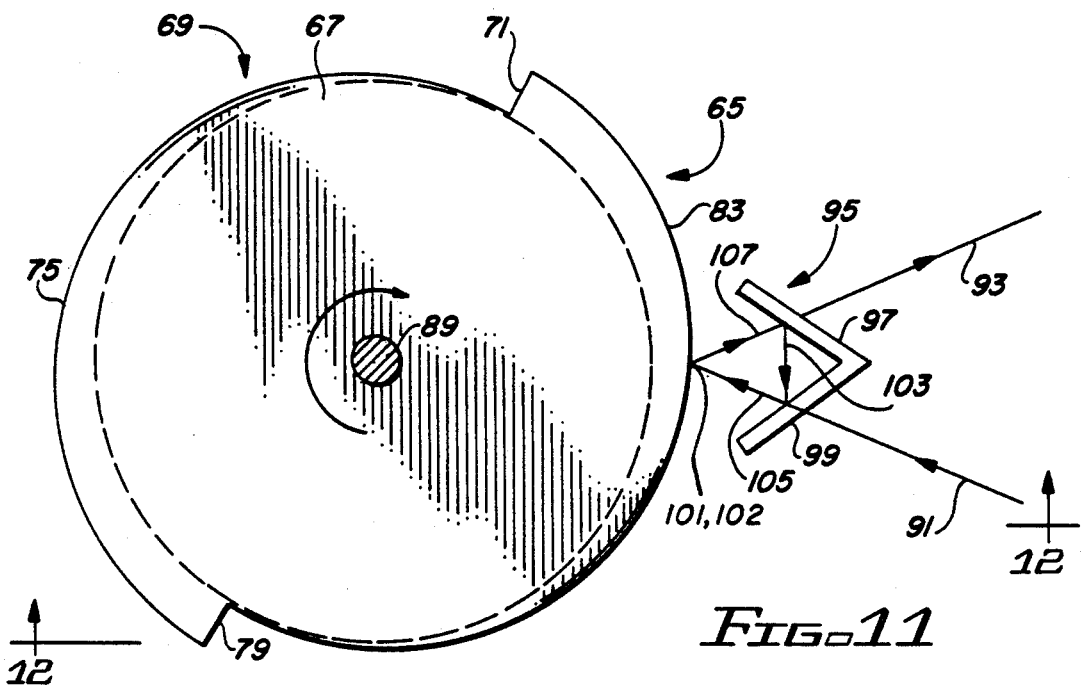
FIG. 11 is a schematic illustration of the spiral phase wheel optical frequency shifter of FIG. 9 used in the reflective mode with a means for canceling dynamic tilt.

The best way to use two reflections is with the beam flipped top-to-bottom between reflections so the dynamic tilt will exactly cancel. The beam flip can be accomplished using the set-up or configuration shown in FIGS. 11 and 12. In FIG. 11, the spiral wheel 65 is shown as being rotated in a clockwise direction bout shaft 89. An impinging beam of light 91 passes by one plate 99 of a conventional beam-flipping configuration 95 having a second plate 97. After passing the plate 99, the beam 91 impinges off of spot 101 on the mirrored rim of the spiraled ramp 83 and is reflected back as beam 107. Beam 107 bounces back off of the roof as beam 103. Beam 103 bounces off of the other plane and back to the rim surface as beam 105. Beam 105 then reflects off of the rim surface at point 102 to bypass the plates and become the compensated reflected beam or frequency shifted beam 93.

Figure 12:
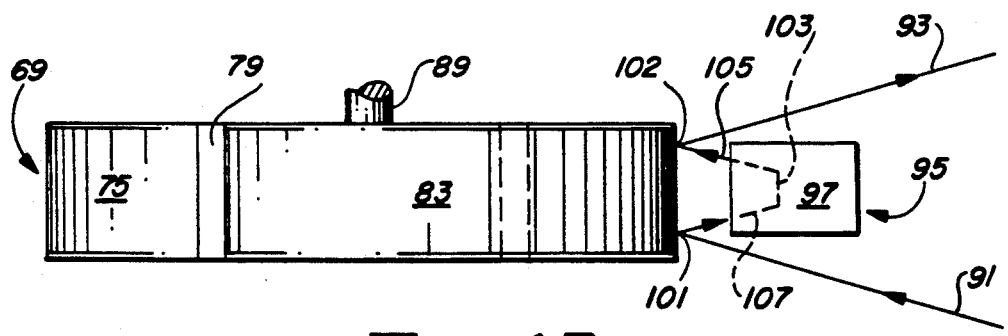
FIG. 12 is a top view of the spiral phase wheel optical frequency shifter and dynamic tilt cancellation means of FIG. 11.

FIG. 12 presents a top view of the system of FIG. 11 and better illustrates the flip compensation system of the present invention. In FIG. 12, the impinging beam 91 is shown as being reflected off of the mirrored rim surface 83 at a point of impingement 101. The reflected beam 107 then enters the beam-flipping mirrors 97, 99 and bounces between them as beam 103. From there, the beam is reflected back as beam 105 to impinge on the surface 83 at a point of impingement 102. The beam is then reflected therefrom as the exiting frequency shifted beam 93. The system of FIGS. 11 and 12 is configured to utilize a double pass wheel plus a beam flip to cancel dynamic tilt.

The roof reflection in FIG. 11 has less than a 90° angle so that the two spots of beam impingement on the wheel can be at the same angular location on the wheel. Both beam spots are then interrupted by the spiral breaks or abutments at the same time. Dynamic focus and higher components can be reduced in exchange for some dynamic tilt and more spiral break interruptions by off-setting the angular locations of the two spots of beam impingement such that the first reflection is at the start of the spiral when the second is half-way up, and the first is half-way up when the second is at the top. The offset can be done either mechanically with two spiral wheels locked together with a fixed angular offset, or optically by having the two reflections at different locations on one spiral wheel.

FIGS. 11 and 12 may, for example, represent a specific example where the optical beam source or laser, not shown, is a $CO_2$ laser, emitting an optical beam 91 at 10.6 $\mu$m wavelength, and a double pass spiral phase wheel 10 cm in diameter with an increase in radius of 2 mm over half a rotation is used. The optical path length will increase by 8 mm or 750 wavelengths in a half revolution of the wheel. If the wheel is rotated at 100

Hz (6000 rpm), the frequency shift will be 150 kHz. The dynamic tilt, canceled by the flip, is about ±0.25 mrad per wheel reflection. The dynamic focus amounts to ±1/25 wavelength per reflection for a 2 mm diameter optical beam, for a dynamic distortion of only ±1/12 wavelength. If the spiral wheel 65 were used for a helium-neon laser beam at 0.6328 μm wavelength, the frequency shift would be 2.5 MHz.

The frequency shift stability will depend on the uniformity of the average wheel wedge over the illuminated spot size. This can be held lower than 0.01% around the whole wheel. Stability will also depend on the uniformity of the speed of rotation of the wheel during a revolution and over many revolutions, which can also be held below 0.01%. Thermal expansion of the wheel will limit long term stability, but thermal expansion of convenient conventional materials is less than 0.002%/° C. and can be lowered further with materials having even lower thermal expansion properties.

It will be understood by those skilled in the art that various modifications, changes, variations, substations, and alterations can be made in the method and apparatus of the present invention without departing from the spirit and scope thereof, which is limited only by the appended claims.

What is claimed is:

1. An optical frequency shifting system comprising:
   a wheel having a pair of opposed faces and an outer peripheral rim portion;
   a wedge of optical material disposed in a layer on a face of said wheel as an optical wedge having at least one of a linearly increasing and a linearly decreasing thickness with respect to the angular position on a surface of said wheel;
   means for rotating said wheel;
   means for generating an optical beam;
   means for impinging said generated optical beam onto said layer of at least one of linearly increasing and a linearly decreasing thickness of said layer disposed on said rotating wheel for linearly varying with time the length of the optical path for shifting the frequency of the exiting optical beam; and
   wherein said one face of said wheel includes at least two cycles of optical wedge of at least one of increasing and decreasing thickness for dynamic balancing purposes.

2. An optical frequency shifting system comprising:
   a wheel having a pair of opposed faces and an outer peripheral rim portion;
   a wedge of optical material disposed in a layer of at least one of a linearly increasing and a linearly decreasing thickness with respect to the angular position on a surface of said wheel;
   means for rotating said wheel;
   means for generating an optical beam;
   means for impinging said generated optical beam onto said layer of at least one of a linearly increasing and a linearly decreasing thickness of said layer disposed on said rotating wheel for linearly varying with time the length of the optical path for shifting the frequency of the exiting optical beam; and
   wherein the outer surface of said layer of at least one of increasing and decreasing thickness includes a mirror finish and wherein said incident optical beam is reflected from said mirror finish along a path with an optical path length that is linearly varying with time for frequency shifting purposes.

3. An optical frequency shifting system comprising:
   a wheel having a pair of opposed faces and an outer peripheral rim portion;
   a wedge of optical material disposed on a face of said wheel as an optical wedge having at least one of a linearly increasing and a linearly decreasing thickness with respect to the angular position on a surface of said wheel;
   means for rotating said wheel;
   means for generating an optical beam;
   means for impinging said generated optical beam onto said layer of at least one of a linearly increasing and a linearly decreasing thickness of said layer disposed on said rotating wheel for linearly varying with time the length of the optical path for shifting the frequency of the exiting optical beam; wherein the exterior surface of said wedge of optical material disposed on said surface of said rotating wheel in which said optical beam is impinged is optically smooth; and
   wherein said optically smooth surface is a mirror.

4. An optical frequency shifting system comprising:
   a wheel having a pair of opposed faces and an outer peripheral rim portion;
   a wedge of optical material disposed in a layer on a face of said wheel as an optical wedge having at least one of a linearly increasing and a linearly decreasing thickness with respect to the angular position on a surface of said wheel;
   means for rotating said wheel;
   means for generating an optical beam;
   means for impinging said generated optical beam onto said layer of at least one of a linearly increasing and a linearly decreasing thickness of said layer disposed on said rotating wheel for linearly varying with time the length of the optical path for shifting the frequency of the exiting optical beam;
   wherein the surface of said wheel about which said optical wedge is disposed includes a face of said wheel, said optical wedge of at least one of said linearly increasing and decreasing thickness being carried on said face as a helical ramp whose thickness varies with angle about the face of said wheel; and
   wherein said face includes at least two helical ramps for dynamic balancing purposes.

5. An optical frequency shifting system comprising;
   a wheel having a pair of opposed faces and an outer peripheral rim portion;
   a wedge of optical material disposed in a layer on a face of said wheel as an optical wedge having at least one of a linearly increasing and a linearly decreasing thickness with respect to the angular position on a surface of said wheel;
   means for rotating said wheel;
   means for generating an optical beam;
   means for impinging said generated optical beam onto said layer of at least one of a linearly increasing and a linearly decreasing thickness of said layer disposed on said rotating wheel for linearly varying with time the length of the optical path for shifting the frequency of the exiting optical beam; and
   wherein the surface of said wheel about which said optical wedge is disposed includes the outer peripheral rim of said wheel, said optical wedge of at least one of linearly increasing and linearly decreasing thickness being carried by the outer peripheral rim of said wheel, the radius of said wheel varying with angular position for forming a spiral ramp on said outer peripheral rim.

6. The system of claim 5 wherein said peripheral rim includes at least two spiral ramps for dynamic balancing purposes.

7. The system of claim 5 wherein said outer peripheral rim includes a mirror finish wherein said generated optical beam is reflected from the optical wedge of increasing or decreasing thickness for varying the optical path length for frequency shifting purposes.

8. An optical frequency shifting system comprising:
 a generally circular wheel having opposed faces, an outer peripheral rim portion, and an axis of rotation;
 said opposed faces comprising at least one helical ramp surface of optical material of at least one of increasing and decreasing thickness with respect to angular location around the wheel;
 means for rotating said wheel;
 means for generating an optical beam and impinging the generated optical beam on said at least one helical ramp surface for changing the length of the optical path with time and shifting the frequency of the optical beam exiting same; and
 wherein said optical material of said at least one helical ramp surface includes a reflective surface such that the optical beam reflected from said surfaces has its optical path length changed linearly with time and hence its frequency shifted.

9. A method of shifting the frequency of an optical beam comprising the steps of:
 providing a wheel whose thickness varies substantially linearly with angular location about the wheel;
 rotating the wheel;
 impinging the optical beam on the surface of the linearly varying thickness of the rotating wheel;
 thereby shifting the frequency of the exiting optical beam while maintaining the optical beam both spatially and temporally coherent with relatively no spread in frequency, and
 wherein said wheel is reflective and said impinging optical beam is reflected off of the surface of said linearly varying thickness thereby increasing or decreasing the length of the optical path to shift the frequency of the exiting reflected beam.

10. An optical frequency shifting system comprising:
 a wheel including an outer peripheral rim portion having at least one of a spirally increasing and a spirally decreasing radius;
 said outer peripheral rim portion of said wheel being mirrored;
 means for rotating said wheel;
 means for generating an optical beam and impinging said optical beam onto said rotating mirrored rim surface for changing the length of the optical path uniformly with time and shifting thereby the frequency of the beam reflected therefrom.

11. The system of claim 10 wherein said optical beam is a coherent beam of light.

12. The system of claim 10 wherein said means for generating said optical beam includes a laser.

13. The system of claim 10 wherein said peripheral rim portion of said wheel includes at least two optical wedge-producing ramps whose radial thickness varies with the spirally varying radius of said wheel for dynamic balancing purposes.

14. The system of claim 10 further including an optical corrector means for compensating for distortions caused by the fact that the spiral does not have a constant radius of curvature.

15. The system of claim 10 wherein increasing the radius of the wheel and decreasing the spiral amplitude each operate to reduce dynamic tilt.

16. The system of claim 10 including an optical beam top-to-bottom flipping means for canceling dynamic tilt.

17. A method for shifting the frequency of an optical beam comprising the steps of:
 providing a wheel whose outer peripheral rim spirally increases in radius linearly with location about the wheel and wherein the outer surface of the rim includes a mirror;
 rotating the wheel; and
 impinging the optical beam on the mirrored surface of the rim of the rotating wheel for changing the optical path length of the reflected beam for shifting the frequency thereof.

18. A method for shifting the frequency of an optical beam comprising the steps of:
 providing a wheel having one face on which at least one helical optical wedge-defining ramp is disposed;
 rotating the wheel
 orienting the ramp-carrying face of the rotating wheel;
 impinging an optical beam on the at least one helical optical wedge-defining ramp of the face of the rotating wheel oriented theretoward for frequency shifting purposes; and
 wherein said step of providing further includes the step of providing a mirror finish on the exposed surface of said at least one optical wedge-defining ramp, said method further including the step of reflecting said impinging optical beam from the surface of said at least one optical wedge-defining ramp, said step of shifting the frequency of said optical beam including the step of substantially linearly varying with time the length of the optical path of the optical beam reflected from the mirrored surface of the at least one optical wedge-defining ramp for shifting the frequency of the reflected optical beam.

19. A method for shifting the frequency of an optical beam comprising the steps of:
 providing a wheel having at least one optical wedge portion of at least one of linearly increasing and linearly decreasing thickness with angular location around the wheel;
 rotating the wheel
 impinging the optical beam onto the surfaces of varying thickness; and thereby
 shifting the frequency of the exiting beam while maintaining the optical beam both spatially and temporally coherent with relatively no spread in frequency; and
 wherein said at least one optical wedge portion incudes a mirror finish and said step of shifting further incudes the step of reflecting the impinging optical beam from the mirror-finished surface of said at least one optical wedge portion and thereby shifting the frequency of the reflected optical beam.

20. A method for shifting the frequency of an optical beam comprising the steps of:

providing a wheel having at least one optical wedge portion of at least one of linearly increasing and linearly decreasing thickness with angular location around the wheel;

rotating the wheel impinging the optical beam onto the surfaces of varying thickness; and thereby shifting the frequency of the exiting beam while maintaining the optical beam both spatially and temporally coherent with relatively no spread in frequency;

wherein said step of providing said wheel includes the step of locating said at least one optical wedge on the face of said wheel and orienting said face toward said impinging optical beam; and wherein the step of providing said wedge portions on a face of said wheel includes the step of providing a mirror finish to the outer surface of said optical wedge portions an wherein the step of frequency shifting said optical beam includes linearly varying with time the length of the optical path of the optical bream as it is reflected off of the mirrored surfaces of said optical wedge portions for frequency shifting purposes.

21. A method for shifting the frequency of an optical beam comprising the steps of:

providing a wheel having at least one optical wedge portion of at least one of linearly increasing and linearly decreasing thickness with angular location around the wheel;

rotating the wheel impinging the optical beam onto the surfaces of varying thickness; and thereby shifting the frequency of the exiting beam while maintaining the optical beam both spatially and temporally coherent with relatively no spread in frequency; and wherein said step of providing said wheel includes the steps of locating said at least one optical wedge portion on the outer peripheral rim of said wheel and orienting the rotating rim of said wheel toward impinging optical beam.

22. The method of claim 21 wherein said step of providing further includes providing the outer surfaces of said optical wedge-defining ramps with a mirror finish and wherein said method further includes the step of reflecting the impinging optical beam off of the mirrored surface of said rotating ramps for linearly varying the optical path length of the reflected beam with time for frequency shifting purposes.

23. The method of claim 21 further including the step of beam-flipping the optical beam between reflections off of the mirrored surface of the ramps for substantially eliminating dynamic tilt error.

24. An optical frequency shifting system comprising:

a wheel having a pair of opposed faces and an outer peripheral rim portion;

the peripheral rim of said wheel including at least one of a spirally increasing and a spirally decreasing radius;

means for rotating said wheel;

means for generating an optical beam; and means for impinging said generated optical beam onto said peripheral rim portion whereby said incident beam of light is reflected therefrom in an optical path whose length linearly varies with time for frequency shifting purposes.

25. The system of claim 54 wherein the peripheral rim of said wheel includes at least two cycles of at least one of a spirally increasing and a spirally decreasing radius for dynamic balancing purposes.

26. A system for shifting the frequency of a laser output beam, said optical frequency shifting system comprising:

a laser for generating an optical output beam having a first frequency;

a phase plate wheel whose thickness changes linearly with angular location about the phase plate wheel disposed in the path of said laser output beam;

means for rotating said phase plate wheel to uniformly change the effective optical length of said path at a constant rate with time thereby uniformly changing the phase of the output beam.

27. The system of claim 26 wherein said phase plate wheel is formed of optically transmissive material and said laser output beam is transmitted through said phase plate wheel.

28. The system of claim 26 wherein said phase plate wheel has a mirrored surface and said laser output beam is reflected from said mirrored surface of said phase plate wheel.

* * * * *